United States Patent [19]
Kerr

[11] 3,835,967
[45] Sept. 17, 1974

[54] TORQUE LIMITER

[75] Inventor: Richard H. Kerr, Springfield, Ohio

[73] Assignee: Kelsey-Haynes Company, Springfield, Ohio

[22] Filed: June 29, 1973

[21] Appl. No.: 375,054

[52] U.S. Cl. .............................. 188/134, 192/8 R
[51] Int. Cl. ........................................... B60t 7/12
[58] Field of Search ......... 188/110, 134; 192/7, 8 R

[56] References Cited
UNITED STATES PATENTS

| | | | |
|---|---|---|---|
| 2,334,734 | 11/1943 | Taylor | 188/134 |
| 2,783,861 | 3/1957 | Jungles | 188/134 X |
| 3,542,162 | 11/1970 | Kerr et al. | 188/134 |
| 3,596,740 | 8/1971 | Nau | 188/134 |

*Primary Examiner*—Duane A. Reger
*Attorney, Agent, or Firm*—Biebel, French & Bugg

[57] ABSTRACT

A system for preventing application of excessive force or torque to a system by locking the system when some predetermined amount of overload is applied thereto. The system is comprised of an input assembly including an input shaft, an output assembly including an output shaft and a pivot member interposed and transmitting drive between the input and output assemblies. In the event of an overload, the pivot member, which may be in the form of a pin or pins or a triangular member, pivots and permits limited rotational movement of the assemblies with respect to each other; thereby allowing camming surfaces carried on the input shaft to cam brake shoes carried by the output assembly into braking engagement with the inner, brake drum surface of the system casing.

28 Claims, 14 Drawing Figures

TORQUE LIMITER

BACKGROUND OF THE INVENTION

Many mechanical systems contain branches, no one of which normally receives more than a portion of the total power of the total system. If such a branch encounters an obstruction, the total system power will be directed to the obstructed branch, inducing forces many times those normally encountered in service. These high forces effect both the mechanical system components and the supporting structure.

One method of protecting system branches from such overloads is to introduce a force-limiting device into the system. Such devices are of two types: mechanical fuses such as slip clutches, and blocking devices. Where systems must retain synchronization, it is necessary to use blocking devices which stop the entire system.

To function efficiently, such blocking devices must possess the following abilities:

1. Accurate and repeatable level of lockout
2. Fast and positive locking action
3. Minimum overload impulse effects
4. Ability to release if overload forces drop to within normal levels
5. Capacity to be set for different tripping values in opposite directions of travel.

Considerable effort has been devoted toward improving efficiency in torque limiting devices. For example, U.S. Pat. No. 3,034,619 shows a basic torque limiter of the proposed general type. This limiter features a simple ball detent used for transmitting normal torque. With this device, the torque on a ball screw actuator is limited to about 350 percent of the transmitted load. Further load snaps the ball from its groove, and allows brake shoes to impact with considerable force. In a second U.S. Pat. No. 3,542,162, a considerably more sophisticated device is used. In this device, a contoured ramp controls ball behavior and so restrains the impact of the brake shoes. This configuration requires axial motion of the ramp block, and friction is minimized by using rolling element splines. This design is improved in overall efficiency to limit loads to about 225 percent of maximum operating values.

A limitation in the structure shown in the above noted U.S. Pat. No. 3,542,162 is in the method of holding the detent ball. The basic geometry of the torque limiter disclosed in this patent precludes the use of a ball retainer, so that ball must be contained in cutouts in the brake shoe assembly. This configuration limits the ability of the ball to roll and increases friction. Since friction is a highly variable phenomenon, the predictability of the torque level at which the limiter will actuate is decreased.

SUMMARY OF THE INVENTION

The present invention utilizes a triangularly shaped pivot plate in place of the ball and ramp construction of the prior art to provide a practically frictionless element. This provides a further reduction in limited loads to about 165 percent of transmitted normal maximum loads and produces repeatability of tripping forces with an accuracy on the order of 1 to 2 percent on a given system.

Specifically, the present invention includes an input assembly including an input shaft, an output assembly including an output shaft and carrying a plurality of brake shoes slidably mounted therein, and a pivot plate interposed between the input and output assemblies and normally transmitting rotational movement from one to the other part but, when an overload is encountered, pivoting to allow a limited rotational movement of the assemblies with respect to each other.

The input shaft contains a plurality of flat surfaces about its periphery defining raised cam means therebetween and the inner ends of the slidable brake shoes normally ride on these flat surfaces. Therefore, when an overload is placed upon the output shaft the pivot plate permits limited relative rotational movement between the input and output assemblies, causing the flat, cam means on the input shaft to cam the brake shoes outwardly into braking engagement with an inner, brake drum surface of the torque limiter casing.

Since, as noted above, many mechanical systems contain branches and the torque limiter of the present invention finds particular application in mechanical systems of this type, there will normally be a plurality of such torque limiters utilized within a single mechanical system. In this situation, it is desirable to be able to determine which of the torque limiters has been actuated. Therefore, in accordance with the present invention, an indicator is provided for determining which of the torque limiters has encountered an overload and therefore is locking out the system.

The indicator includes a plunger slidably mounted within the torque limiter casing axially thereof and engageable by a pin on a portion of the input assembly which carries the pivot bar. Therefore, when the pivot bar pivots, displacing a portion of the input housing axially of the input shaft, the plunger slides axially of the casing. An indicator button is mounted in an opening in one end of the casing in engagement with the plunger, so that when the plunger moves the button pops outwardly of the casing indicating that that particular torque limiter has encountered an overload.

Setting devices of this type and adjusting the various components thereof can often be a tedious and difficult job, particularly when it is attempted to do so by shimming and where a large number of small parts must be held within a deep housing. In the preferred configuration of the present invention, however, the principal working parts are contained within a two piece cartridge in which the pieces are threaded together. This provides two advantages not often available in torque limiters. It makes an easily adjustable cartridge assembly which may be bench assembled and tested away from the confining housing, and it is adaptable to a variable torque device which can be set simply at different torque levels for different applications.

DESCRIPTION OF THE PREFERRED EMBODIMENTS

Figure 1:
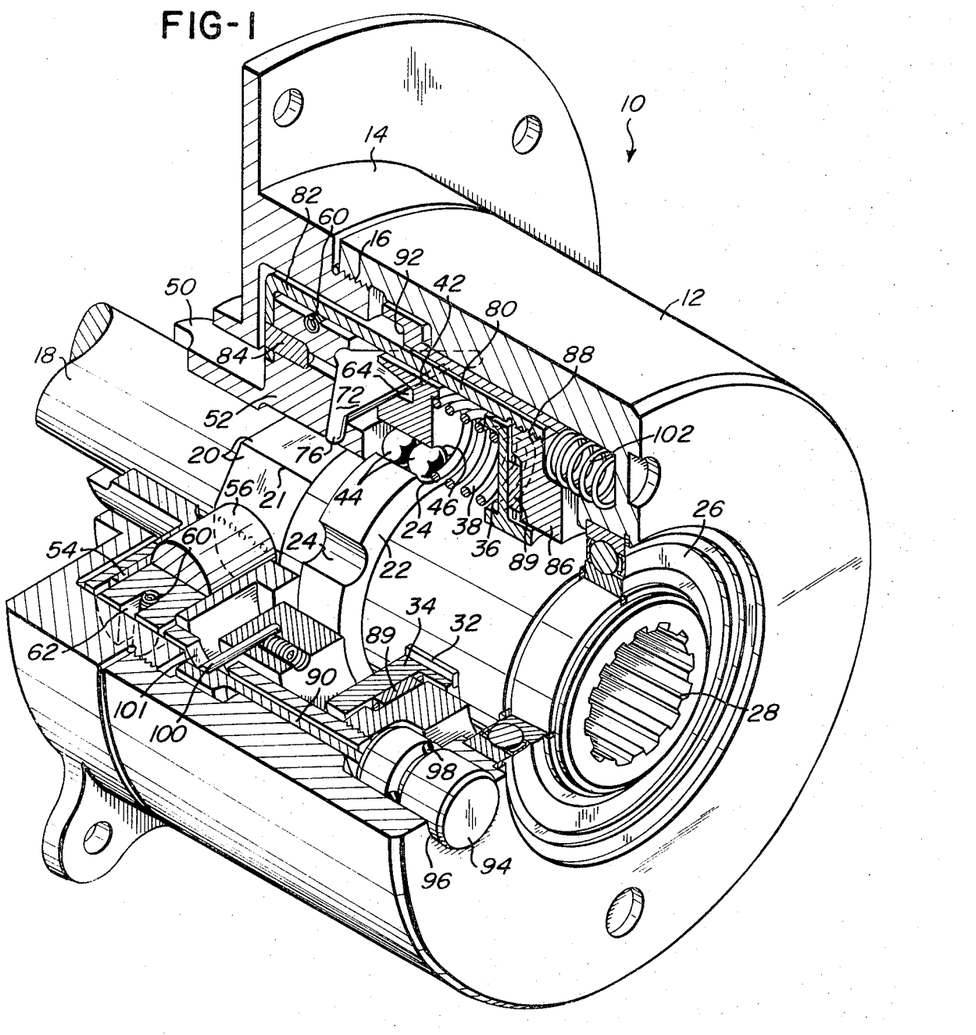
FIG. 1 is a perspective view with portions broken away showing the torque limiter of the present invention.

Turning initially to FIG. 1 of the drawings, it will be seen that the torque limiter of the present invention includes a casing 10 formed in two sections, including a bearing section 12 and a brake drum section 14 threadably engaged with each other as at 16.

Figures 2, 3:
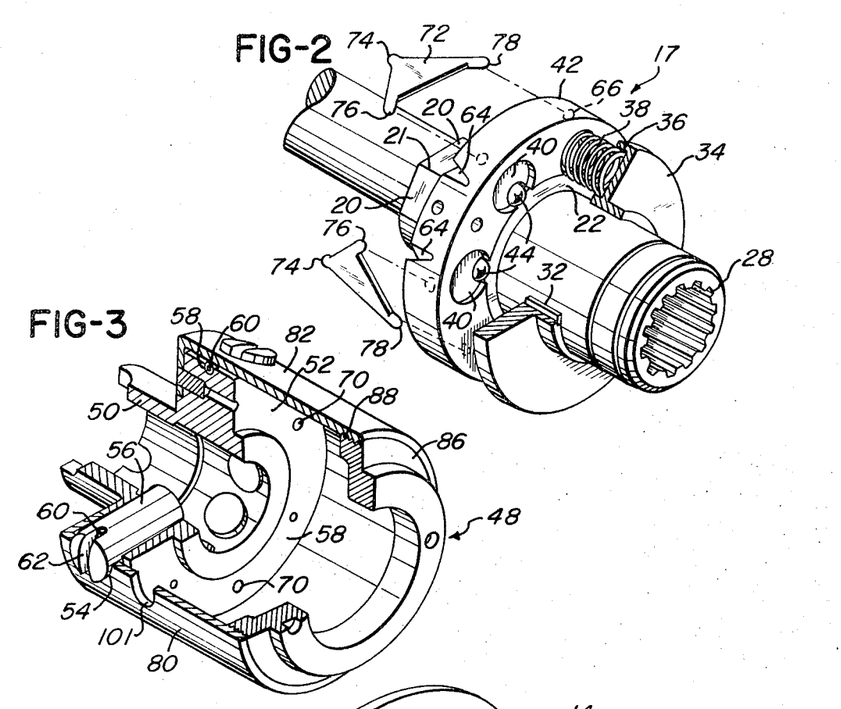
FIG. 2 is a perspective view with portions broken away showing the input assembly including the input shaft thereof.
FIG. 3 is a view similar to FIG. 2 but showing the output assembly and the two piece cartridge which houses most of the working parts of the assemblies.

As seen in FIGS. 1 and 2, the input assembly 17 includes an input shaft 18 having a series of flat surfaces 20 formed about the periphery thereof within the casing 10 and defining a plurality of cams 21. Spaced axially along the shaft 18 from the cam defining surfaces 20 is an enlarged section 22 which includes a plurality of bearing defining grooves 24.

Spaced further along the shaft and received in a bearing 26 is an internally splined end 28 of the input shaft adapted to receive an externally and complementarily splined opposite end of an additional shaft 18 from an adjacent unit.

Figure 5:
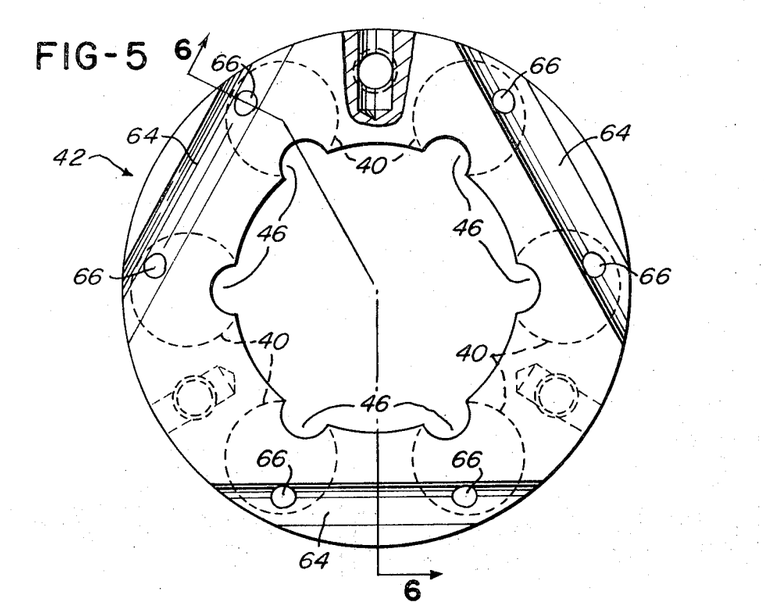
FIG. 5 is an elevational view of one end of the pivot plate housing.
Figure 6:
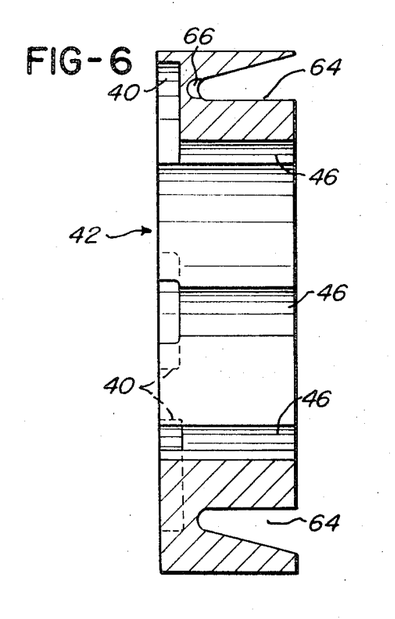
FIG. 6 is a view taken on line 6—6 of FIG. 5.

Keyed to the shaft 18 by means of a key 32 is a spring retainer 34. Spring retainer 34 includes a plurality of spring receiving pockets 36, each of which holds a coil spring 38. Springs 38 are engaged at their opposite ends in spring receiving pockets 40 in a pivot plate housing 42 which is also shown in FIGS. 5 and 6 of the drawings.

A series of ball bearings 44 are received in the grooves 24 in the input shaft and also in matching grooves 46 formed in the pivot plate housing 42, so that the housing 42 is locked against relative rotational movement with respect to the input shaft 18 but may move a limited amount axially thereof against the force of the springs 38.

While ball bearings are shown by way of example, and do in fact provide reduced friction, it will be apparent that other methods of keying the input shaft to the pivot plate housing which will allow relative axial movement between the two components may also be used.

Figure 7:
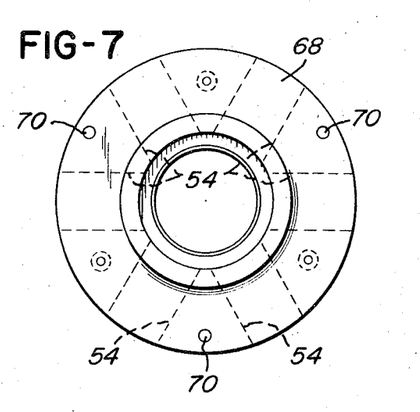
FIG. 7 is an elevational view of one end of the brake shoe retainer.

The output assembly 48, as best seen in FIGS. 1 and 3 of the drawings, includes an output shaft 50 formed integrally with the brake shoe retainer 52 which, as also seen in FIG. 7, includes a plurality of radial passages 54 extending therethrough. Each of the radially extending passages 54 slidably receives a brake shoe 56, which during normal operation will have its flat inner end engaging one of the flat, cam defining surfaces 20 on the input shaft 18.

A groove 58 extends circumferentially about the brake shoe retainer and receives a garter spring 60 which is also received in the grooves 62 in the outer end of each of the brake shoes 56 and urges them inwardly into engagement with the cam portion of the input shaft 18.

As best seen in FIG. 5 of the drawings, the pivot plate housing is provided with a series of equally spaced slots 64, three being shown for purposes of illustration, although it will be apparent that this number may be varied. Each of the slots 64 includes, as also seen in FIG. 6 of the drawings, a pair of sockets 66. The brake shoe retainer 52, as best seen in FIG. 7, has formed in a radial face 68 thereof a plurality of sockets 70 corresponding in number to the number of pairs of sockets 66, there being three sockets 70 and three pairs of sockets 66.

Pivot plate members 72, as best seen in FIGS. 1 and 2, have rounded apices 74, 76 and 78. The plate members 72 are received in the slots 64 in the housing 42 with their rounded apices 76 and 78 received within a pair of sockets 66 and the rounded apex 74 received in a socket 70 in a brake shoe retainer 52.

While it is convenient to provide the bases of the pivot plate members with rounded apices 76 and 78 received in the sockets 66, it will be apparent that, if desired, the rounded apices 76 and 78 and sockets 66 may be dispensed with, since it will usually be found the sockets 70 receiving the apices 74 of the pivot plate members will be sufficient.

It will also be noted from FIG. 1 of the drawings that a cartridge type housing 80 encloses the components of both the input and output assemblies. Housing 80 consists of a cylindrical portion 82 pinned, as at 84, to the brake shoe retainer 52 and a second portion 86 threadably attached thereto, as at 88. A needle thrust washer 89 is interposed between the member 86 and the spring retainer 34 to permit a small relative rotational movement between these members on the order of approximately 12°.

Portion 86 limits movement of spring retainer 34 axially of the assembly in a direction away from the pivot member housing 42 but yet permits some adjustment, by virtue of the threaded connection 88, to vary the spring force of the springs 38. This in turn provides for adjustment of the torque value at which the locking action of the system comes into effect.

Figure 4:
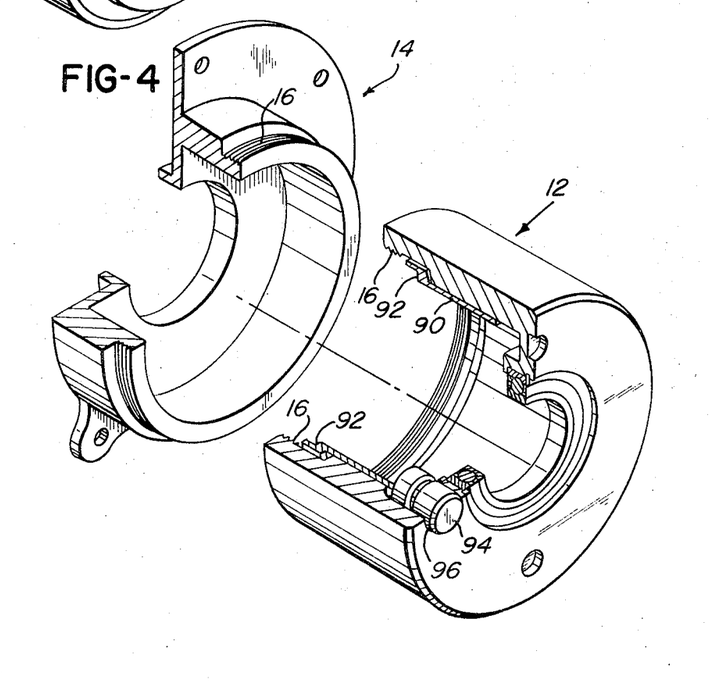
FIG. 4 is a perspective view of the torque limiter casing with portions broken away to show the indicator structure.

As best seen in FIGS. 1 and 4 of the drawings, a plunger 90 having a shoulder portion 92 is slidable in the casing section 12 and bears on its opposite end against one end of an indicator button 94. Button 94 is slidably received in an opening 96 in the bearing section 12 of the casing and has a relieved central portion receiving an O-ring 98. O-ring 98 frictionally engages the walls of the opening 96 and normally holds the indicator button in place within the casing section 12.

A pin 100 is fixed in the pivot plate housing 42 and extends radially outwardly thereof through an opening 101 in housing 80 and into engagement with shoulder 92 of plunger 90. Additionally, springs 102 are provided urging the plunger 90 to the left as seen in FIG. 1 of the drawings.

In operation, an input rotational force will be applied to the input shaft 18 and transmitted through the ball bearings 44 and the key 32 to the housing 42 and the spring retainer 34, respectively. The pivot plate 72 seated in the sockets 66 and 70 will transmit the rotational force of the housing 42 to the brake shoe retainer 52. Since the retainer 52 is formed integrally with the output shaft 50, rotation of the input shaft will result in rotation of the output shaft. The housing 80, of course, since it is pinned as at 84 to the brake shoe retainer 52 rotates therewith.

Should an overload be encountered, the output shaft will tend to stop while the input shaft will tend to continue to rotate and, as described below, will in fact rotate a limited amount. The resulting action of the pivot plate as the torque limiter encounters an overload is best understood with reference to FIGS. 8 through 11 of the drawings.

Figure 8:
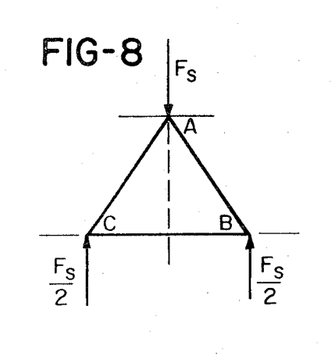
FIGS. 8 through 11 are a series of force diagrams showing the force encountered by the pivot plate during operation.

Thus, as shown in FIG. 8, the pivot plate in under the forces of the spring load only. Points B and C, corresponding to rounded apices 76 and 78, lie in sockets 66 on housing 42. Point A, corresponding to apex 74, lies in socket 70 on retainer 52. The force at A is the sum of the spring forces at B and C. In an equilateral triangular configuration, forces B and C are equal.

Figure 9:
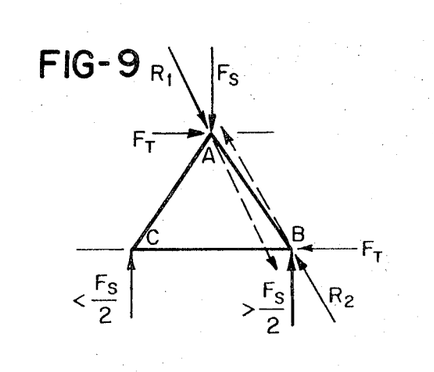

In FIG. 9, a transverse torque force is introduced at Point B from housing 42, and is resisted by an output load at Point A. The resultant $R_1$ is directed between Points B and C, and the pivot plate 72 does not move. The A portion of the axial load at C is transferred to B, but this resultant force $R_2$ still holds the plate in place.

Figure 10:
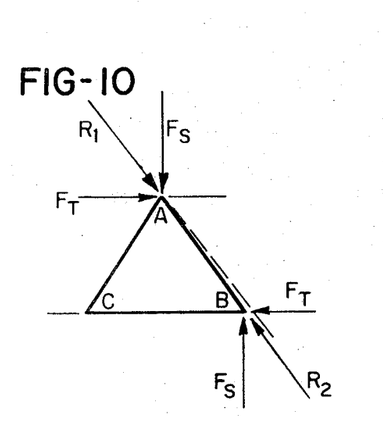

FIG. 10 shows the effect of a load slightly exceeding the torque limiter setting. In this case, the resultant $R_1$ falls outside Point B, inducing a tipping moment. $R_2$ falls on or very near Point A, so the net effect is to tip the pivot plate. Note that the entire spring force from housing 42 is on Point B.

Figure 11:
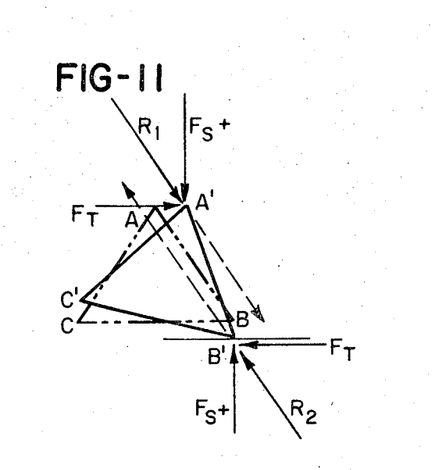

FIG. 11 shows the pivot plate tipped. Point B has moved axially to Point B' producing further spring compression and additional spring force at Points B' and A'. Point A has moved transversely to A', permitting the cams 20 to actuate brake shoes 56.

The method of action of the brake shoes 56 is to permit a small relative rotation between the input shaft 18 and the brake shoes 56 in their seats 54 within retainer 52. This rotation causes them to be moved away from their places on the flat portions of cam surfaces 20 as illustrated in FIG. 1 to be wedged by the high point of cam surfaces 20 against the inner surface of the drum section 14 of the torque limiter casing 10. The brake shoes thus stop the input and output and prevent further load increase against the resistance at A.

Figure 12:
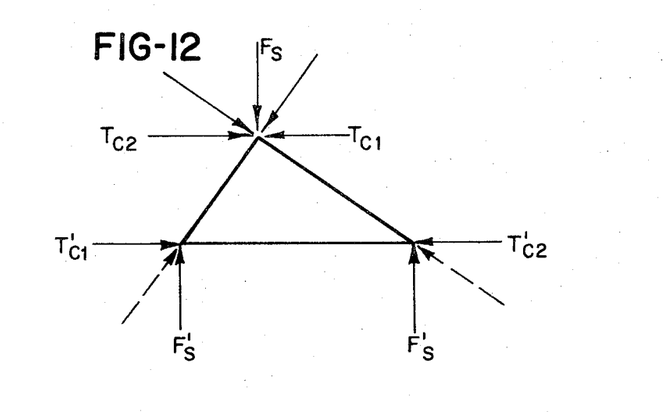
FIG. 12 is a force diagram showing the forces encountered by a modified pivot plate during operation.

With reference now to FIG. 12 of the drawings, the forces encountered on a pivot plate having sides of unequal length extending between the input and output assemblies are shown. Thus, within an asymmetrical pivot plate the torque limit will be different in opposite directions of rotation. Therefore, the pivot plate will tip at a smaller component $T_{c1}$ when operating against the shorter moment arm than the torque component $T_{c2}$ required to tip against the longer moment arm.

While in the above description the pivot means is illustrated as a triangular plate having either equal or unequal side edges extending between the input and output assemblies, other pivot means may also be utilized in accordance with the present invention.

Figure 13:
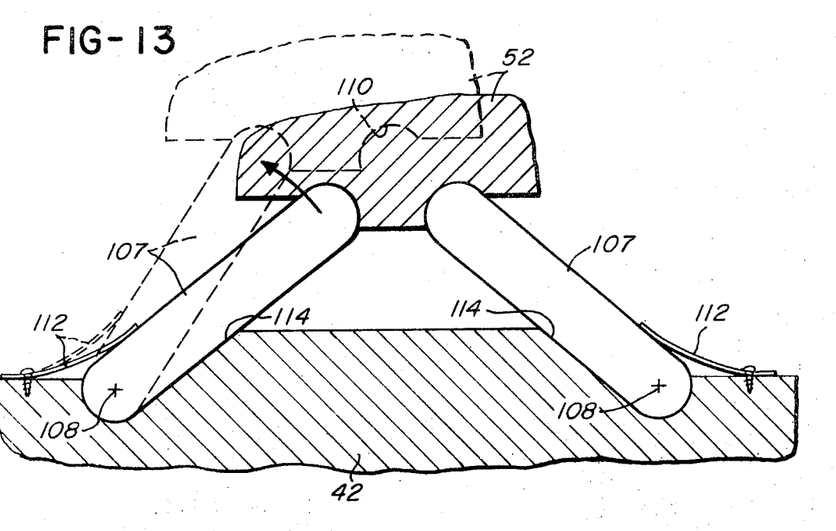
FIG. 13 shows another embodiment of the invention wherein a pair of pins are utilized in place of a pivot plate.

For example, as seen in FIG. 13, pairs of pins 107 may be provided, pivotally mounted as at 108, in the pivot housing 42 in place of pivot plates and received in sockets 110 in the brake shoe retainer 52. Leaf springs 112 attached to the housing 42 urge each of the pins 107 against the inclined surfaces 114.

Upon experiencing an overload, it will be seen that the members 52 and 42 will move relative to each other, as indicated by the phantom lines, camming the brake shoes outwardly into engagement with braking surface. Although the housing 52 is shown for purposes of clarity as the member which has moved during pivoting action, it will be apparent that it will be the housing 42 which actually moves, the important thing being that there is relative movement between the two components.

Figure 14:
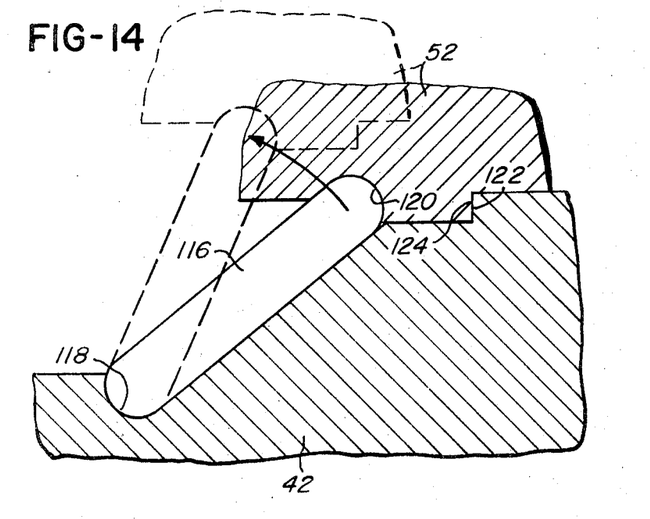
FIG. 14 shows yet another embodiment in which a single pin and stop member is substituted for a pivot plate.

It is also possible within the scope of the present invention to utilize a series of single pins and a stop or stops to provide a unidirectional torque limiting system. Thus, as seen in FIG. 14 of the drawings, in a single pin arrangement pins 116 extend between the housing 42 and the brake shoe retainer 52 and are received in sockets 118 in the housing 42 in place of pivot plates and in sockets 120 in member 52. Additionally, members 42 and 52 are provided with normally abutting shoulders 122 and 124, respectively.

With this arrangement, if an overload is encountered in one direction of rotation the pin 116 may pivot from the solid to the phantom line position shown, allowing relative rotation between members 42 and 52 and camming the brake shoes into engagement with the braking surface. Again, as in the previous embodiment, the member 52 is shown as displaced for purposes of clarity, although in actual practice the member 42 will experience limited axial movement upon the imposition of an overload on the system in one direction. Of course, by virtue of the abutting shoulders 122 and 124 unlimited torque may be transmitted between the members 42 and 52 in the opposite direction.

While the forms of apparatus herein described constitutes preferred embodiments of the invention, it is to be understood that the invention is not limited to these precise forms of apparatus, and that changes may be made therein without departing from the scope of the invention.

What is claimed is:

1. A torque limiter comprising:
   a. a rotatably mounted input assembly,
   b. an output assembly spaced from said input assembly and mounted for rotational movement coaxially with said input assembly,
   c. tippable pivot means interposed between said input and output assemblies for transferring rotational movement from one to the other,
   d. means mounting said pivot means in said input and output assemblies for tipping movement of said pivot means permitting relative rotational movement between said input and output assemblies when a predetermined resistance to rotational movement by one of said assemblies is encountered,
   e. brake means carried by one of said assemblies for rotational movement therewith,
   f. means permitting movement of said braking means from a nonbraking to a braking position thereof,
   g. cam means carried by the other of said assemblies and engageable with said brake means upon said relative rotational movement between said input and output assemblies to cause movement of said brake means from said nonbraking to said braking position, and h. a braking surface engageable by said brake means upon displacement thereof by said cam means from said nonbraking to said braking positions.

2. The torque limiter of claim 1 wherein said pivot means comprises:
   a. a substantially triangular plate.

3. The torque limiter of claim 2 wherein:
   a. the lengths of the sides of said triangular plate extending between said input and output assemblies are substantially equal in length.

4. The torque limiter of claim 2 wherein:
   a. the lengths of the sides of said triangular plate extending between said input and said output assemblies are appreciably different in length.

5. The torque limiter of claim 1 wherein said pivot means comprises:
   a. pin means extending between said input and output assemblies angularly with respect to the axis of rotation thereof.

6. The torque limiter of claim 5 wherein said pin means comprises:
   a. opposed pairs of pins each extending between said input and output assemblies at an acute angle to the axis of rotation thereof.

7. The torque limiter of claim 5 wherein said pin means comprises:
   a. a single pin member extending between said input and output assemblies at spaced locations about said axis of rotation thereof,
   b. said pin members being angularly disposed with respect to the axis of rotation of said assemblies.

8. The torque limiter of claim 7 further comprising:
   a. stop means for preventing relative rotational movement between said input and output assemblies in one direction of rotation thereof.

9. The torque limiter of claim 1 further comprising:
   a. means urging opposing faces of said input and output assemblies towards each other axially of the axis of rotation thereof and resisting said tipping movement of said pivot means.

10. The torque limiter of claim 9 further comprising:
    a. means for adjusting the force with which said urging means urges said opposing faces of said assemblies toward each other.

11. The torque limiter of claim 1 wherein:
    a. said means for permitting movement of said braking means permits movement in a direction normal to the axis of rotation of said assemblies.

12. The torque limiter of claim 11 wherein:
    a. said braking surface is concentrically disposed with respect to said assembly carrying said brake means.

13. The torque limiter of claim 1 wherein said input assembly comprises:
    a. an input shaft,
    b. a pivot means housing encircling said shaft,
    c. means mounting said pivot means housing for movement axially of said input shaft while fixing said pivot means housing against rotational movement with respect to said shaft,
    d. a spring retainer encircling said input shaft in spaced relationship to said pivot means housing,
    e. means fixing said spring retainer against movement axially of said shaft in a direction away from said pivot means housing, and
    f. spring means interposed between said spring retainer and said pivot means housing and urging said pivot means housing toward said output assembly.

14. The torque limiter of claim 13 wherein:
    a. said spring retainer fixing means is adjustable with respect to said input shaft to vary the compression of said spring means between said spring retainer and said pivot means housing.

15. The torque limiter of claim 1 wherein:
    a. said pivot means mounting means comprises sockets formed in opposing faces of said input and output assemblies.

16. The torque limiter of claim 15 wherein:
    a. said pivot means comprises a substantially triangular plate member having the apices thereof received in said sockets.

17. The torque limiter of claim 1 further comprising:
    a. means for indicating when said brake means have engaged said braking surface.

18. In a torque limiter having a casing, an input assembly including an input shaft, and an output assembly including an output shaft, the improvement comprising:
    a. A plurality of cam surfaces positioned about the circumference of the shaft of one of said assemblies within said casing,
    b. a plurality of brake shoes carried by the other of said assemblies and rotatable in unison with said cam surfaces on said shaft of said one of said assemblies during normal operation thereof,
    c. inner ends of said brake shoes being circumferentially offset with respect to said cam surfaces during said normal operations,
    d. means mounting said brake shoes for radial movement within said other of said assemblies upon engagement of said inner ends thereof by said cam surfaces,
    e. a braking surface surrounding outer ends of said brake shoes,
    f. tippable pivot means interposed between said assemblies and transferring rotation from said input shaft to said output shaft during said normal operation thereof, and
    g. means mounting said pivot means in said assemblies for tipping movement of said pivot means upon a predetermined amount of resistance to rotation encountered by said output shaft permitting limited rotational movement between said input and output assemblies upon said tipping of said pivot means to allow said cam surfaces to move said brake means radially outwardly into braking engagement with said braking surface.

19. The torque limiter of claim 18 wherein said pivot means comprises:
    a. a plurality of pivot bars equally spaced about said input shaft.

20. The torque limiter of claim 19 wherein said pivot bars each comprise:
    a. a substantially triangular plate member.

21. The torque limiter of claim 20 wherein said means mounting said pivot means comprises:

a. sockets in said assemblies receiving the apices of said triangular plate member.

22. The torque limiter of claim 18 wherein said pivot means comprises:
   a. a substantially triangular plate member,
   b. side edges of said plate member extending between said input and output assemblies being of substantially equal lengths.

23. The torque limiter of claim 18 wherein said pivot means comprises:
   a. a substantially triangular plate member,
   b. the side edges of said triangular plate member extending between said input and output assemblies being of appreciably different lengths.

24. The torque limiter of claim 18 wherein said pivot means comprises:
   a. pin means extending between said input and output assemblies angularly disposed with respect to the axis of rotation of said assemblies.

25. The torque limiter of claim 24 wherein said pin means comprises:
   a. opposed pairs of pins extending from one of said assemblies to the other of said assemblies in converging relationship to each other.

26. The torque limiter of claim 24 wherein said pin means comprises:
   a. a single pin member extending between said input and output assemblies at spaced locations about said axis of rotation thereof,
   b. said pin members being angularly disposed with respect to the axis of rotation of said assemblies.

27. The torque limiter of claim 18 further comprising:
   a. means for indicating when said brake shoes have engaged said braking surface.

28. The torque limiter of claim 27 wherein said indicating means comprises:
   a. an indicator button positioned in said casing for sliding movement outwardly thereof,
   b. a plunger slidably received in said casing in engagement with said indicator button, and
   c. means for transmitting to said plunger movement of a portion of said input assembly axially of said input shaft to cause sliding movement of said button outwardly of said casing.

* * * * *